United States Patent
Dong et al.

(10) Patent No.: US 10,129,712 B2
(45) Date of Patent: *Nov. 13, 2018

(54) FLOOR CONTROL METHOD AND APPARATUS

(71) Applicant: Huawei Technologies Co., Ltd., Shenzhen (CN)

(72) Inventors: Ying Dong, Shenzhen (CN); Shaofeng Liu, Shanghai (CN); Haiyue Li, Xi'an (CN); Xiaobin Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,392

(22) Filed: Mar. 21, 2018

(65) Prior Publication Data

US 2018/0213369 A1 Jul. 26, 2018

Related U.S. Application Data

(63) Continuation of application No. 15/639,829, filed on Jun. 30, 2017, now Pat. No. 9,949,095, which is a
(Continued)

(51) Int. Cl.
*H04B 7/00* (2006.01)
*H04W 4/10* (2009.01)
(Continued)

(52) U.S. Cl.
CPC ............. *H04W 4/10* (2013.01); *H04L 12/189* (2013.01); *H04L 65/4069* (2013.01);
(Continued)

(58) Field of Classification Search
CPC ..... H04W 4/10; H04W 76/45; H04W 12/189; H04W 4/06; H04W 84/042; H04W 88/02
See application file for complete search history.

(56) References Cited

U.S. PATENT DOCUMENTS 8,185,144 B1 * 5/2012 Wick ................ H04M 1/72533
 455/519
2002/0102999 A1 * 8/2002 Maggenti ............ H04L 12/1822
 455/518
(Continued)

FOREIGN PATENT DOCUMENTS

CN 1984382 A 6/2007
CN 102394877 A 3/2012
(Continued)

OTHER PUBLICATIONS

3GPP TS 23.246 V12.4.0 (Dec. 2014), 3rd Generation Partnership Project; Technical Specification Group Services and System Aspects; Multimedia Broadcast/Multicast Service (MBMS); Architecture and functional description (Release 12), total 67 pages.
(Continued)

*Primary Examiner* — Dominic E Rego
(74) *Attorney, Agent, or Firm* — Slater Matsil, LLP

(57) ABSTRACT

A floor control method and apparatus are disclosed. In an embodiment a floor control method includes receiving, by a server over Long Term Evolution network, a first message sent by user equipment (UE), wherein the first message comprises a parameter indicating that an event type is a floor request, generating, by the server, a second message according to a floor control policy and the first message, wherein the second message comprises a parameter indicating that an event type is floor granted and sending, by the server, the second message to the UE, wherein the second message is used to instruct the UE to notify a user of the UE that a floor is granted.

9 Claims, 10 Drawing Sheets

Related U.S. Application Data continuation of application No. PCT/CN2014/095654, filed on Dec. 30, 2014.

(51) Int. Cl.
| | |
|---|---|
| *H04W 76/45* | (2018.01) |
| *H04L 12/18* | (2006.01) |
| *H04W 4/06* | (2009.01) |
| *H04L 29/06* | (2006.01) |
| *H04W 84/04* | (2009.01) |
| *H04W 88/02* | (2009.01) |

(52) U.S. Cl.
CPC ............ *H04W 4/06* (2013.01); *H04W 76/45* (2018.02); *H04W 84/042* (2013.01); *H04W 88/02* (2013.01)

(56) References Cited

U.S. PATENT DOCUMENTS

| | | |
|---|---|---|
| 2005/0122923 A1 | 6/2005 | Jang et al. |
| 2006/0073795 A1* | 4/2006 | Mayblum .............. H04N 7/148 |
| | | 455/90.2 |
| 2006/0211450 A1 | 9/2006 | Niekerk et al. |
| 2006/0253589 A1* | 11/2006 | Shiraki .............. H04L 65/4061 |
| | | 709/226 |
| 2006/0265451 A1 | 11/2006 | Tomimori |
| 2007/0019595 A1 | 1/2007 | Huh et al. |
| 2007/0049314 A1 | 3/2007 | Balachandran et al. |
| 2007/0065357 A1* | 3/2007 | Chien .................. H04W 76/45 |
| | | 423/518 |
| 2007/0155416 A1 | 7/2007 | Donnellan |
| 2008/0032699 A1* | 2/2008 | Jang ...................... H04W 76/45 |
| | | 455/452.1 |
| 2008/0102869 A1 | 5/2008 | Shaffer et al. |
| 2008/0194279 A1* | 8/2008 | Choksi .............. H04W 72/005 |
| | | 455/518 |
| 2008/0220765 A1 | 9/2008 | Chu et al. |
| 2009/0042556 A1* | 2/2009 | Saito ...................... H04M 3/56 |
| | | 455/422.1 |
| 2009/0054010 A1* | 2/2009 | Shaffer .............. H04B 7/18532 |
| | | 455/90.2 |
| 2009/0124237 A1* | 5/2009 | Minami .................. H04M 3/38 |
| | | 455/412.1 |
| 2011/0165905 A1 | 7/2011 | Shuman |
| 2012/0082098 A1 | 4/2012 | Oprescu-Surcobe et al. |
| 2012/0289227 A1* | 11/2012 | Dhodapkar ......... H04L 12/1827 |
| | | 455/435.1 |
| 2013/0029714 A1 | 1/2013 | Koren et al. |
| 2013/0155875 A1* | 6/2013 | Ayyasamy .............. H04W 4/08 |
| | | 370/242 |
| 2013/0217447 A1* | 8/2013 | Sakamoto ............... H04M 1/60 |
| | | 455/571 |
| 2013/0288754 A1* | 10/2013 | Osanai ............. H04M 1/72519 |
| | | 455/566 |
| 2013/0315164 A1 | 11/2013 | Arur et al. |
| 2014/0106808 A1 | 4/2014 | Agulnik et al. |
| 2014/0324973 A1* | 10/2014 | Goel ...................... H04W 4/70 |
| | | 709/204 |
| 2014/0355508 A1 | 12/2014 | Anchan et al. |
| 2016/0127474 A1 | 5/2016 | Sharma et al. |

FOREIGN PATENT DOCUMENTS

| | | |
|---|---|---|
| RU | 2420922 C2 | 6/2011 |
| RU | 2469501 C2 | 12/2012 |
| WO | 2007081172 A1 | 7/2007 |
| WO | 2008047995 A1 | 4/2008 |

OTHER PUBLICATIONS

SA WG2 Meeting #105 S2-143806, "High Level MCPTT Architecture", Vodafone, Nokia Networks, BlackBerry UK Ltd, rev of S2-143735, Oct. 13-17, 2014, total 5 pages.

Open Mobile Alliance, OMS-AD_PoC-V2_0-20060524-D, Push to talk over Cellular (PoC)—Architecture Draft Version 2.0—May 24, 2006, total 55 pages.

Open Mobile Alliance, OMA-TS_PoC-UserPlane-V2_0-D, PoC User Plane, Draft Version 2.0—Jun. 19, 2006, total 179 pages.

\* cited by examiner

FLOOR CONTROL METHOD AND APPARATUS

CROSS-REFERENCE TO RELATED APPLICATIONS

This application is a continuation of U.S. patent application Ser. No. 15/639,829, filed on Jun. 30, 2017, which is a continuation of International Application No. PCT/CN2014/095654, filed on Dec. 30, 2014. All of the afore-mentioned patent applications are hereby incorporated by reference in their entireties.

TECHNICAL FIELD

The present invention relates to the communications field, and in particular, to a floor control method and apparatus.

BACKGROUND

Push-To-Talk Over Cellular (PoC) is a Push-to-Talk (PTT) service in a public cellular mobile communications network. The PIT service implements a mobile voice service of a walkie-talkie and has the following advantages: a call set-up time is short, a channel is occupied only when a user talks, only a channel is listened to when a call is answered, and a receiver can receive call information at any time without off-hook.

The PoC is a two-way, instant, and multi-party communication manner and allows two or more user equipments to communicate with each other. A user may press a key to send a voice to all participants of a session.

In an existing PoC service solution, a floor control solution is that floor information is reported by using the Real-Time Transport Control Protocol (RTCP) and by using a dedicated unicast connection of user equipment. However, in a PoC architecture, both signaling on a control plane and bearing on a media plane are implemented in a PoC server PoC Server, and the control plane and the media plane are not separated. This causes difficulty in subsequent technology evolution and is not conducive to either flexible implementation of services or system extension. In the prior art, there is no detailed floor control procedure after the control plane and the media plane are separated.

SUMMARY

Embodiments of the present invention provide a floor control method and apparatus, so as to resolve a prior-art problem: A control plane and a media plane of a Push-To-Talk Over Cellular (PoC) service are not separated, and this causes difficulty in subsequent technology evolution and is not conducive to either flexible implementation of services or system extension; and there is no detailed floor control procedure after the control plane and the media plane are separated.

According to a first aspect of the present embodiments, a floor control method is provided, where the method includes receiving, by a mission-critical push-to-talk (MCPTT) server over Long Term Evolution network, a first message that is sent by user equipment (UE), where the first message includes an identifier of a group to which a talker corresponding to the UE belongs and a parameter indicating that an event type is a floor request. The method also includes generating, by the MCPTT server, a second message according to a floor control policy and the first message, where the second message includes the identifier of the group to which the talker corresponding to the UE belongs and the parameter indicating that an event type is a floor request, and the second message is used to instruct the UE to notify the talker to whom the UE belongs that a floor is granted and sending, by the MCPTT server, the second message to the UE. Additionally, the method includes receiving, by the MCPTT server, a response message that is of the second message and that is sent by the UE generating, by the MCPTT server, a first instruction message according to the response message of the second message, where the first instruction message is used to instruct a media resource function entity to perform uplink voice switching on a media plane. The method also includes sending, by the MCPTT server, the first instruction message to the media resource function entity.

With reference to the first aspect of the present embodiments, in a first implementation manner of the first aspect, the method further includes: receiving, by the MCPTT server, a fourth message that is sent by the UE, where the fourth message includes the identifier of the group to which the talker corresponding to the UE belongs, a parameter indicating that an event type is floor release, and a release cause value; generating, by the MCPTT server, a second instruction message according to the fourth message, where the second instruction message is used to instruct the media resource function entity to disconnect from the UE on the media plane; and sending, by the MCPTT server, the second instruction message to the media resource function entity.

With reference to the first aspect of the present embodiments, in a second implementation manner of the first aspect, the method further includes: determining, by the MCPTT server, that the talker needs to release the floor, and generating a fifth message, where the fifth message includes the identifier of the group to which the talker corresponding to the UE belongs, a parameter indicating that an event type is floor release, and a release cause value; sending, by the MCPTT server, the fifth message to the UE; receiving, by the MCPTT server, a response message that is of the fifth message and that is sent by the UE; generating, by the MCPTT server, a third instruction message according to the response message of the fifth message, where the third instruction message is used to instruct the media resource function entity to disconnect from the UE on the media plane; and sending, by the MCPTT server, the third instruction message to the media resource function entity.

With reference to the first aspect of the present embodiments, in a third implementation manner of the first aspect, a message type of the fifth message is an information INFO message or a notification NOTIFY message.

With reference to the first aspect of the present embodiments, in a fourth implementation manner of the first aspect, the method further includes: sending, by the MCPTT server, a first notification message to a broadcast/multicast service center (BM-SC), where the first notification message includes a temporary mobile group identity (TMGI) and an identity of the talker, and the first notification message is used to instruct the BM-SC to notify, by using a multicast channel, a device used by another member, except the talker, that is in a multicast area and that is in the group to which the talker belongs of information indicating that a floor of the talker is granted.

With reference to the first implementation manner of the first aspect of the present embodiments or the second implementation manner of the first aspect of the present embodiments, in a fifth implementation manner of the first aspect of the present embodiments, the method further includes: sending, by the MCPTT server, a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is released, where the identity of the talker is a preset value.

With reference to the first aspect of the present embodiments, in a sixth implementation manner of the first aspect of the present embodiments, the method further includes: sending, at a multicast endpoint by the MCPTT server, a first notification message to the media resource function entity, where the first notification message includes a temporary mobile group identity (TMGI), an identity of the talker, and multicast endpoint information, and the first notification message is used to instruct the media resource function entity to notify, by using a BM-SC, a device used by another member, except the talker, that is in a multicast area and that is in the group to which the talker belongs of information indicating that a floor of the talker is granted.

With reference to the first implementation manner of the first aspect of the present embodiments or the second implementation manner of the first aspect of the present embodiments, in a seventh implementation manner of the first aspect of the present embodiments, the method further includes: sending, by the MCPTT server, a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is released, where the identity of the talker is a preset value.

With reference to any one of the first aspect of the present embodiments or the first implementation manner to the seventh implementation manner of the first aspect of the present embodiments, in an eighth implementation manner of the first aspect of the present embodiments, the method further includes: determining, by the MCPTT server, that the talker needs to be notified of remaining floor duration, and generating a first floor duration notification message, where the first floor duration notification message includes the identifier of the group to which the talker belongs, a parameter indicating that an event type is floor timeout, and the remaining floor duration; sending, by the MCPTT server, the first floor duration notification message to the UE; receiving, by the MCPTT server, a response message that is of the first floor duration notification message and that is sent by the UE; generating, by the MCPTT server, the second instruction message according to the response message of the first floor duration notification message, where the second instruction message includes the identity of the talker, and the second instruction message is used by the media resource function entity to instruct the UE to notify the talker of the remaining floor duration; and sending, by the MCPTT server, the second instruction message to the media resource function entity.

With reference to any one of the first aspect of the present embodiments or the first implementation manner to the eighth implementation manner of the first aspect of the present embodiments, in a ninth implementation manner of the first aspect of the present embodiments, a message type of the first message is an information INFO message or a notification NOTIFY message; and/or a message type of the second message is an information INFO message or a notification NOTIFY message.

According to a second aspect of the present embodiments, a floor control apparatus is provided, where the apparatus includes a first receiving module, configured to receive a first message that is sent by a UE, where the first message includes an identifier of a group to which a talker corresponding to the UE belongs and a parameter indicating that an event type is a floor request. Additionally, the flor control apparatus includes a first generation module, configured to generate a second message according to the floor control policy and the first message, where the second message includes the identifier of the group to which the talker corresponding to the UE belongs and the parameter indicating that an event type is a floor request, and the second message is used to instruct the UE to notify the talker to whom the UE belongs that a floor is granted. The floor control apparatus also includes a first sending module, configured to send the second message to the UE, where the first receiving module is further configured to receive a response message that is of the second message and that is sent by the UE. The first generation module is further configured to generate a first instruction message according to the response message of the second message, where the first instruction message is used to instruct a media resource function entity to perform uplink voice switching on a media plane, and the first sending module is further configured to send the first instruction message to the media resource function entity.

With reference to the second aspect of the present embodiments, in a first implementation manner of the second aspect of the present embodiments, the first receiving module is further configured to receive a fourth message that is sent by the UE, where the fourth message includes the identifier of the group to which the talker corresponding to the UE belongs, a parameter indicating that an event type is floor release, and a release cause value; the first generation module is further configured to generate a second instruction message according to the fourth message, where the second instruction message is used to instruct the media resource function entity to disconnect from the UE on the media plane; and the first sending module is further configured to send the second instruction message to the media resource function entity.

With reference to the second aspect of the present embodiments, in a second implementation manner of the second aspect of the present embodiments, the apparatus further includes a first determining and generation module, where the first determining and generation module is configured to determine that the talker needs to release the floor, and generate a fifth message, where the fifth message includes the identifier of the group to which the talker corresponding to the UE belongs, a parameter indicating that an event type is floor release, and a release cause value; the first sending module is further configured to send the fifth message to the UE; the first receiving module is further configured to receive a response message that is of the fifth message and that is sent by the UE; the first generation module is further configured to generate a third instruction message according to the response message of the fifth message, where the third instruction message is used to instruct the media resource function entity to disconnect from the UE on the media plane; and the first sending module is further configured to send the third instruction message to the media resource function entity.

With reference to the second aspect of the present embodiments, in a third implementation manner of the second aspect of the present embodiments, the first sending module is further configured to send a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is granted.

With reference to the first implementation manner of the second aspect of the present embodiments or the second implementation manner of the second aspect of the present embodiments, in a fourth implementation manner of the second aspect of the present embodiments, the first sending module is further configured to send a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is released, where the identity of the talker is a preset value.

With reference to the second aspect of the present embodiments, in a fifth implementation manner of the second aspect of the present embodiments, the first sending module is further configured to send, at a multicast endpoint, a first notification message to the media resource function entity, where the first notification message includes a TMGI, an identity of the talker, and multicast endpoint information, and the first notification message is used to instruct the media resource function entity to notify, by using a BM-SC, a device used by another member, except the talker, that is in a multicast area and that is in the group to which the talker belongs of information indicating that a floor of the talker is granted.

With reference to the first implementation manner of the second aspect of the present embodiments or the second implementation manner of the second aspect of the present embodiments, in a sixth implementation manner of the second aspect of the present embodiments, the first sending module is further configured to send a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is released, where the identity of the talker is a preset value.

With reference to any one of the second aspect of the present embodiments or the first implementation manner to the sixth implementation manner of the second aspect of the present embodiments, in a seventh implementation manner of the second aspect of the present embodiments, the first determining and generation module is further configured to determine that the talker needs to be notified of remaining floor duration, and generate a first floor duration notification message, where the first floor duration notification message includes the identifier of the group to which the talker belongs, a parameter indicating that an event type is floor timeout, and the remaining floor duration; the first sending module is further configured to send the first floor duration notification message to the UE; the first receiving module is further configured to receive a response message that is of the first floor duration notification message and that is sent by the UE; the first generation module is further configured to generate the second instruction message according to the response message of the first floor duration notification message, where the second instruction message includes the identity of the talker, and the second instruction message is used by the media resource function entity to instruct the UE to notify the talker of the remaining floor duration; and the first sending module is further configured to send the second instruction message to the media resource function entity.

With reference to any one of the second aspect of the present embodiments or the first implementation manner to the seventh implementation manner of the second aspect of the present embodiments, in an eighth implementation manner of the second aspect of the present embodiments, a message type of the first message is an information INFO message or a notification NOTIFY message; and/or a message type of the second message is an information INFO message or a notification NOTIFY message.

With reference to any one of the second aspect of the present embodiments or the first implementation manner to the seventh implementation manner of the second aspect of the present embodiments, in an eighth implementation manner of the second aspect of the present embodiments, the apparatus is an MCPTT server.

According to a third aspect of the present embodiments, a floor control method is provided, where the method includes: receiving, by a MCPTT server over Long Term Evolution network, a first message that is sent by a UE, where the first message includes an identifier of a group to which a talker corresponding to the UE belongs and a parameter indicating that an event type is a floor request; generating, by the MCPTT server, a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value; and sending, by the MCPTT server, the third message to the UE.

With reference to the third aspect of the present embodiments, in a first implementation manner of the third aspect of the present embodiments, a message type of the first message is an information INFO message or a notification NOTIFY message; and/or a message type of the third message is an information INFO message or a notification NOTIFY message.

According to a fourth aspect of the present embodiments, a floor control apparatus is provided, where the apparatus includes: a second receiving module, configured to receive a first message that is sent by UE, where the first message includes an identifier of a group to which a talker corresponding to the UE belongs and a parameter indicating that an event type is a floor request; a second generation module, configured to generate a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value; and a second sending module, configured to send the third message to the UE.

With reference to the fourth aspect of the present embodiments, in a first implementation manner of the fourth aspect of the present embodiments, a message type of the first message is an information INFO message or a notification NOTIFY message; and/or a message type of the third message is an information INFO message or a notification NOTIFY message.

With reference to the fourth aspect of the present embodiments or the first implementation manner of the fourth aspect of the present embodiments, in a second implementation manner of the fourth aspect, the apparatus is an MCPTT server.

According to the floor control method provided in the embodiments of the present embodiments, a control plane and a media plane of a Push-to-Talk (PTT) service can be separated, and transmission information on a control plane for floor control and a floor control (including floor application, floor deny, floor release, remaining floor duration notification, and floor information notification by using a multicast channel) procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension. Moreover, compared with a unicast notification manner in the prior art, other user equipment in a group, except user equipment that has obtained a floor, is notified of floor change information in a broadcast multicast manner. In this way, a delay is shorter, and user experience is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

The following embodiments may be applied to a fourth-generation network such as an Long Term Evolution (LTE) network, may be applied to a third-generation network such as a Universal Mobile Telecommunications System (UMTS) network or a Code Division Multiple Access 2000 (CDMA 2000) network, or may be applied to a second-generation network such as a Code Division Multiple Access (CDMA) network or a Global System for Mobile Communications (GSM) network.

Figure 1:
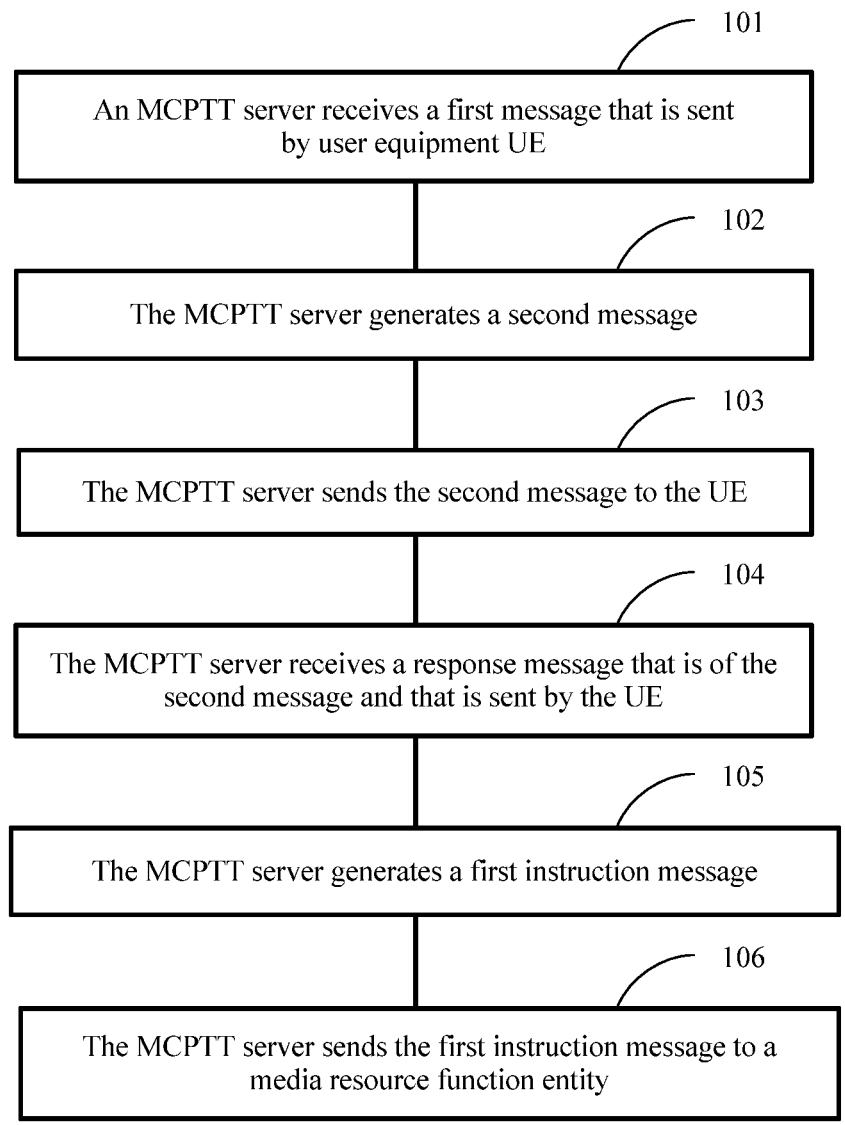
FIG. 1 is flowchart 1 of a floor control method according to an embodiment of the present invention.

Embodiment 1 of the present invention is described in detail in the following by using FIG. 1 as an example. This embodiment of the present invention provides a floor control method, the method is specifically a successful floor application procedure, and the method includes the following steps.

Step 101: A mission-critical push-to-talk (MCPTT) server over Long Term Evolution network receives a first message that is sent by user equipment (UE), where the first message includes an identifier of a group to which a talker corresponding to the UE belongs and a parameter indicating that an event type is a floor request. Optionally, a message type of the first message may be an information INFO message or a notification NOTIFY message in the Session Initiation Protocol (SIP) protocol.

Step 102: The MCPTT server generates a second message according to the floor control policy and the first message. Optionally, a message type of the second message may be an information INFO message or a notification NOTIFY message in the SIP protocol. The second message includes the identifier of the group to which the talker corresponding to the UE belongs and the parameter indicating that an event type is a floor request, and the second message is used to instruct the UE to notify the talker to whom the UE belongs that a floor is granted.

The floor control policy includes at least one of a status of the group to which the talker belongs, a user priority, a user floor control right, or a current floor queue status.

The determining, according to the user priority, to grant the talker a floor may be: determining that a user priority of the talker is higher than that of a current floor holder or meets a floor grant standard, and granting the talker the floor.

The determining, according to the user floor control right, to grant the talker a floor may be: determining that the talker has a user floor right, and granting the talker the floor.

The determining, according to the status of the group to which the talker belongs, to grant the talker a floor may be: checking whether currently there is a user in the group who holds the floor. If currently there is a floor holder, the floor is granted to the talker after it is determined that a user priority of the talker is higher than that of the current floor holder and it is determined that the talker has a user floor right (for example, the talker is not in a blacklist); or if currently there is no floor holder, the floor is granted to the talker after it is determined that the talker has a user floor right (for example, the talker is not in a blacklist).

The determining, according to the current floor queue status, to grant the talker a floor maybe: determining, according to a priority of the talker, that there is no need to perform floor priority queuing, and determining to grant the talker the floor, or determining, according to a priority of the talker, that there is a need to perform floor priority queuing, and determining to grant the talker the floor after queuing up for a period of time.

Step 103: The MCPTT server sends the second message to the UE.

Step 104: The MCPTT server receives a response message that is of the second message and that is sent by the UE.

Optionally, a message type of the response message of the second message may be a 200 message in the SIP protocol.

Step 105: The MCPTT server generates a first instruction message according to the response message of the second message, where the first instruction message is used to instruct a media resource function entity to perform uplink voice switching on a media plane.

Step 106: The MCPTT server sends the first instruction message to the media resource function entity.

For a specific floor application procedure, further refer to Embodiment 3.

According to the floor control method provided in this embodiment of the present invention, a control plane and a media plane of a PTT service can be separated, and transmission information on a control plane for floor control and a floor application procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension.

Figure 2:
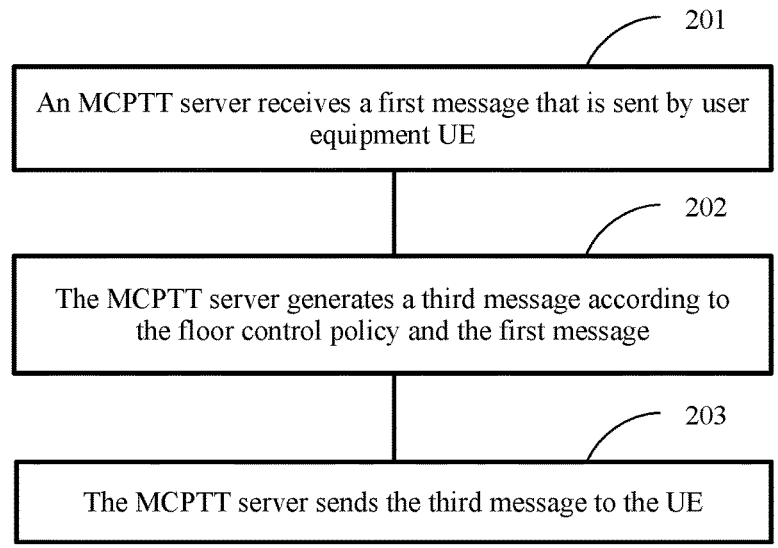
FIG. 2 is flowchart 2 of another floor control method according to an embodiment of the present invention.

Embodiment 2 of the present invention is described in detail in the following by using FIG. 2 as an example. This embodiment of the present invention provides a floor control method, the method is specifically a floor deny procedure, and the method includes the following steps.

Step 201: A MCPTT server over Long Term Evolution network receives a first message that is sent by a UE, where the first message includes an identifier of a group to which a talker corresponding to the UE belongs and a parameter indicating that an event type is a floor request.

Optionally, a message type of the first message may be an information INFO message or a notification NOTIFY message in the SIP protocol.

Step 202: The MCPTT server generates a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value.

Optionally, a message type of the third message is an information INFO message or a notification NOTIFY message.

The floor control policy includes at least one of a status of the group to which the talker belongs, a user priority, a user floor control right, or a current floor queue status.

The determining, according to the user priority, to deny granting the talker a floor may be: determining that a user priority of the talker is lower than that of a current floor holder or does not meet a floor grant standard, and denying granting the talker the floor.

The determining, according to the user floor control right, to deny granting the talker a floor may be: determining that the talker does not have a user floor right, and denying granting the talker the floor.

The determining, according to the status of the group to which the talker belongs, to deny granting the talker a floor may be: checking whether currently there is a user in the group who holds the floor. If currently there is a floor holder, granting of the floor to the talker is denied after it is determined that a user priority of the talker is lower than that of the current floor holder or it is determined that the talker does not have a user floor right (for example, the talker is in a blacklist); or if currently there is no floor holder, granting of the floor to the talker is denied after it is determined that the talker does not have a user floor right (for example, the talker is in a blacklist).

The determining, according to the current floor queue status, to deny granting the talker a floor maybe: determining, according to a priority of the talker, that there is a need to perform floor priority queuing, and determining to deny granting the talker the floor.

Step 203: The MCPTT server sends the third message to the UE.

For a specific floor deny procedure, further refer to Embodiment 4.

According to the floor control method provided in this embodiment of the present invention, a control plane and a media plane of a PTT service can be separated, and transmission information on a control plane for floor control and a floor deny procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension.

Figure 3:
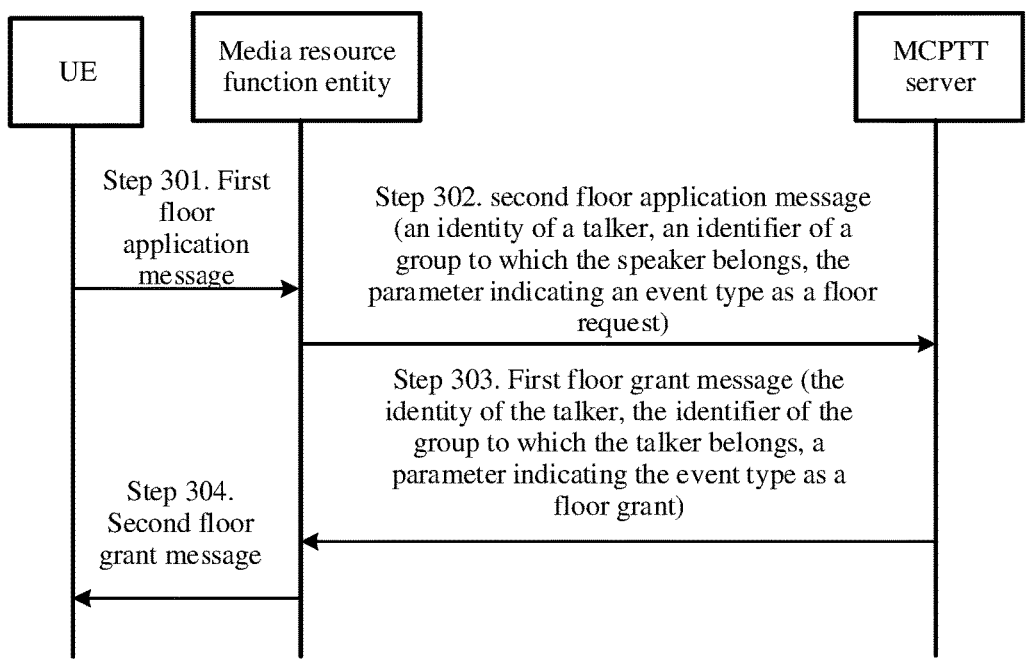
FIG. 3 is flowchart 3 of another floor control method according to an embodiment of the present invention.

Embodiment 3 of the present invention is described in detail in the following by using FIG. 3 as an example. This embodiment of the present invention provides a floor control method, the method is specifically a successful floor application procedure, and the method includes the following steps.

Step 301: A talker presses a PTT key on a UE (user equipment), and the UE sends a first message to an MCPTT server, where the first message includes an identifier of a group to which the talker corresponding to the UE belongs and a parameter indicating that an event type is a floor request. Optionally, a message type of the first message is an information INFO message or a notification NOTIFY message in the SIP protocol.

Optionally, in step 302, the MCPTT server sends a response message of the first message to the UE, and optionally, a message type of the response message of the first message may be a 200 message in the Session Initiation Protocol (SIP).

Step 303: The MCPTT server generates a second message according to the floor control policy and the first message. The second message includes the identifier of the group to which the talker corresponding to the UE belongs and a parameter indicating that an event type is a floor request, and the second message is used to instruct the UE to notify the talker to whom the UE belongs that a floor is granted. Optionally, a message type of the second message may be an information INFO message or a notification NOTIFY message in the SIP protocol.

The floor control policy includes at least one of a status of the group to which the talker belongs, a user priority, a user floor control right, or a current floor queue status.

The determining, according to the user priority, to grant the talker a floor may be: determining that a user priority of the talker is higher than that of a current floor holder or meets a floor grant standard, and granting the talker the floor.

The determining, according to the user floor control right, to grant the talker a floor may be: determining that the talker has a user floor right, and granting the talker the floor.

The determining, according to the status of the group to which the talker belongs, to grant the talker a floor may be: checking whether currently there is a user in the group who holds the floor. If currently there is a floor holder, the floor is granted to the talker after it is determined that a user priority of the talker is higher than that of the current floor holder and it is determined that the talker has a user floor right (for example, the talker is not in a blacklist); or if currently there is no floor holder, the floor is granted to the talker after it is determined that the talker has a user floor right (for example, the talker is not in a blacklist).

The determining, according to the current floor queue status, to grant the talker a floor maybe: determining, according to a priority of the talker, that there is no need to perform floor priority queuing, and determining to grant the talker the floor, or determining, according to a priority of the talker, that there is a need to perform floor priority queuing, and determining to grant the talker the floor after queuing up for a period of time.

The MCPTT server sends the second message to the UE. After receiving the second message, the UE notifies the talker that the floor is granted.

Step 304: The UE generates a response message of the second message, and sends the response message of the second message to the MCPTT server. Optionally, a message type of the response message of the second message may be a 200 message in the Session Initiation Protocol (SIP).

Step 305: The MCPTT server generates a first instruction message according to the response message of the second message, where the first instruction message is used to instruct a media resource function entity to perform uplink voice switching on a media plane. The MCPTT server sends the first instruction message to the media resource function entity.

Step 306: The media resource function entity generates, according to the first instruction message, a response message of the first instruction message, and sends the response message of the first instruction message to the MCPTT server.

Optionally, after receiving the response message that is of the first instruction message and that is sent by the media resource function entity, the MCPTT server may notify another member in the group to which the talker belongs that the talker is granted the floor.

According to the floor control method provided in Embodiment 1 or Embodiment 3 or both of the present invention, a control plane and a media plane of a PIT service can be separated, and transmission information on a control plane for floor control and a floor application procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension.

Figure 4:
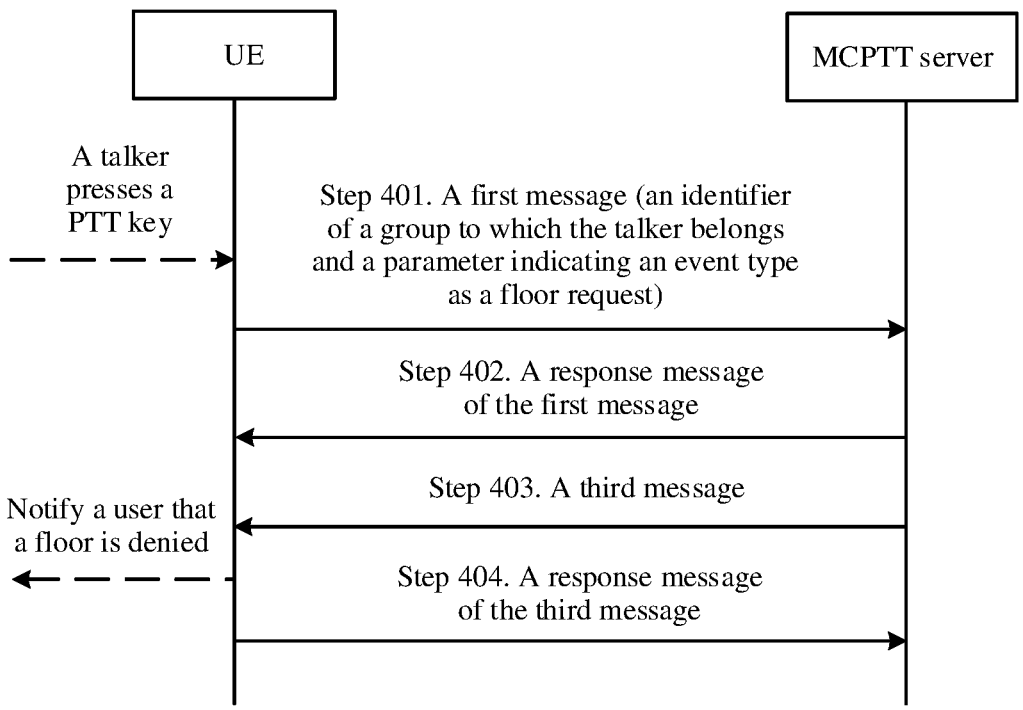
FIG. 4 is flowchart 4 of another floor control method according to an embodiment of the present invention.

Embodiment 4 of the present invention is described in detail in the following by using FIG. 4 as an example. This embodiment of the present invention provides a floor control method, the method is specifically a floor deny procedure, and the method includes the following steps.

Step 401: A talker presses a PTT key on a UE (user equipment), and the UE sends a first message to an MCPTT server, where the first message includes an identifier of a group to which the talker corresponding to the UE belongs and a parameter indicating that an event type is a floor request. Optionally, a message type of the first message may be an information INFO message or a notification NOTIFY message in the SIP protocol.

Optionally, in step 402, the MCPTT server sends a response message of the first message to the UE, and optionally, a message type of the response message of the first message may be a 200 message in the Session Initiation Protocol (SIP).

Step 403: The MCPTT server generates a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value. Optionally, a message type of the third message may be an information INFO message or a notification NOTIFY message in the SIP protocol. The MCPTT server sends the third message to the UE.

The floor control policy includes at least one of a status of the group to which the talker belongs, a user priority, a user floor control right.

The determining, according to the user priority, to deny granting the talker a floor may be: determining that a user priority of the talker is lower than that of a current floor holder or does not meet a floor grant standard, and denying granting the talker the floor.

The determining, according to the user floor control right, to deny granting a floor to the talker may be: determining that the talker does not have a user floor right, and denying granting the talker the floor.

The determining, according to the status of the group to which the talker belongs, to deny granting the talker a floor may be: checking whether currently there is a user in the group who holds the floor. If currently there is a floor holder, granting of the floor to the talker is denied after it is determined that a user priority of the talker is lower than that of the current floor holder or it is determined that does not have the talker has a user floor right (for example, the talker is in a blacklist); or if currently there is no floor holder, granting of the floor to the talker is denied after it is determined that the talker does not have a user floor right (for example, the talker is in a blacklist).

The determining, according to the current floor queue status, to deny granting the talker a floor maybe: determining, according to a priority of the talker, that there is a need to perform floor priority queuing, and determining to deny granting the talker the floor.

After receiving the third message, the UE notifies the talker that the floor application is denied.

Optionally, in step 404, the UE generates a response message of the third message according to the third message, and sends the response message of the third message to the MCPTT server. Optionally, a message type of the response message of the third message may be a 200 message in the SIP (Session Initialization Protocol).

According to the floor control method provided in this embodiment of the present invention, a control plane and a media plane of a PTT service can be separated, and transmission information on a control plane for floor control and a floor deny procedure method are defined. This helps a control plane function entity and a media plane function entity to separately perform subsequent technology evolution In addition, configuration can be flexibly performed at a service layer, and a service feature can be flexibly defined, so that a service is flexibly implemented. This also helps system extension.

Figure 5:
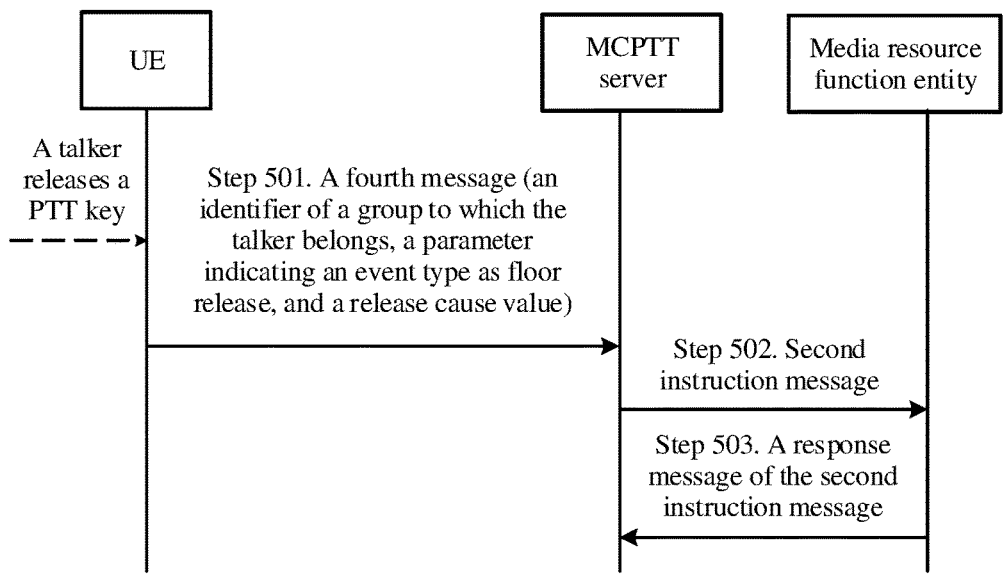
FIG. 5 is flowchart 5 of another floor control method according to an embodiment of the present invention.

Embodiment 5 of the present invention is described in detail in the following by using FIG. 5 as an example. This embodiment of the present invention provides a floor control method, the method is specifically a floor release procedure, and the method includes the following steps.

Step 501: A talker releases a PIT key on UE, and the UE sends a fourth message to an MCPTT server, where the fourth message includes an identifier of a group to which the talker corresponding to the UE belongs, a parameter indicating that an event type is floor release, and a release cause value.

Optionally, a message type of the fourth message may be an information INFO message or a notification NOTIFY message in the SIP protocol.

Step 502: The MCPTT server generates a second instruction message according to the fourth message, where the second instruction message is used to instruct a media resource function entity to disconnect from the UE on a media plane. The MCPTT server sends the second instruction message to the media resource function entity. Optionally, before generating the second instruction message, the MCPTT server may check a status of the group to which the talker belongs, and/or refresh a status of the group to which the talker belongs.

Optionally, in step 503, the media resource function entity generates a response message of the second instruction message according to the second instruction message, and sends the response message of the second instruction message to the MCPTT server.

Optionally, after step 501, the method further includes: by the MCPTT server, a response message of the fourth message according to the fourth message, and sending the response message of the fourth message to the UE.

Optionally, a message type of the response message of the fourth message may be a 200 message in the SIP protocol.

Optionally, after the media resource function entity sends the response message of the second instruction message to the MCPTT server, the MCPTT server notifies another member in the group to which the talker belongs of information indicating that a floor of the talker is released.

Figure 6:
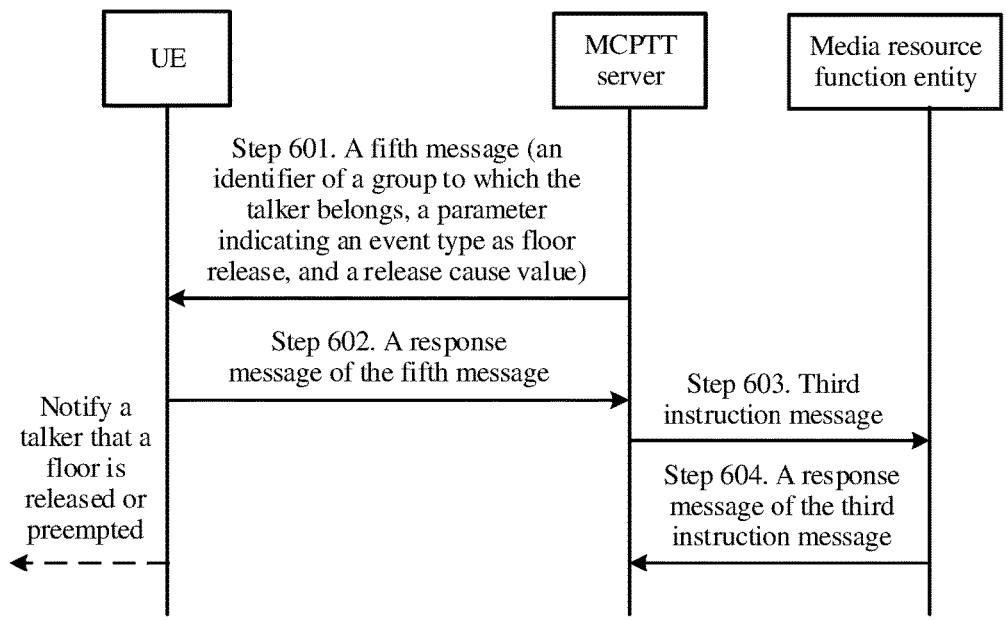
FIG. 6 is flowchart 6 of another floor control method according to an embodiment of the present invention.

Embodiment 6 of the present invention is described in detail in the following by using FIG. 6 as an example. This embodiment of the present invention provides another floor release procedure, and the method includes the following steps.

Step 601: The MCPTT server determines that the talker needs to release a floor, and generates a fifth message, where the fifth message includes an identifier of a group to which the talker corresponding to the UE belongs, a parameter indicating that an event type is floor release, and a release cause value. Optionally, a message type of the fifth message may be an information INFO message or a notification NOTIFY message in the SIP protocol. The MCPTT server sends the fifth message to the UE.

The determining, by the MCPTT server, that the talker needs to release the floor may include: determining, by the MCPTT server, that the floor of the talker expires, or a talker having a higher priority is preempting the floor.

Step 602: The UE receives the fifth message that is sent by the MCPTT server, and generates a response message of the fifth message according to the fifth message, and sends the response message of the fifth message to the MCPTT server. After sending the response message of the fifth message to the MCPTT server, the UE notifies the talker that the floor is released.

Optionally, a message type of the response message of the fifth message may be a 200 message in the SIP protocol.

Step 603: The MCPTT server receives the response message that is of the fifth message and that is sent by the UE. The MCPTT server generates a third instruction message according to the response message of the fifth message, where the third instruction message is used to instruct a media resource function entity to disconnect from the UE on a media plane. The MCPTT server sends the third instruction message to the media resource function entity.

Optionally, in step 604, the media resource function entity receives the third instruction message, generates a response message of the third instruction message according to the third instruction message, and sends the response message of the third instruction message to the MCPTT server.

Optionally, the foregoing method may further include the following step: After the MCPTT server receives the response message that is of the fifth message and that is sent by the UE, the MCPTT server may notify another member in the group to which the talker belongs that the talker has released the floor.

According to the floor control method provided in Embodiment 5 or Embodiment 6 or both of the present invention, a control plane and a media plane of a PIT service can be separated, and transmission information on a control plane for floor control and a floor release procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension.

Figure 7:
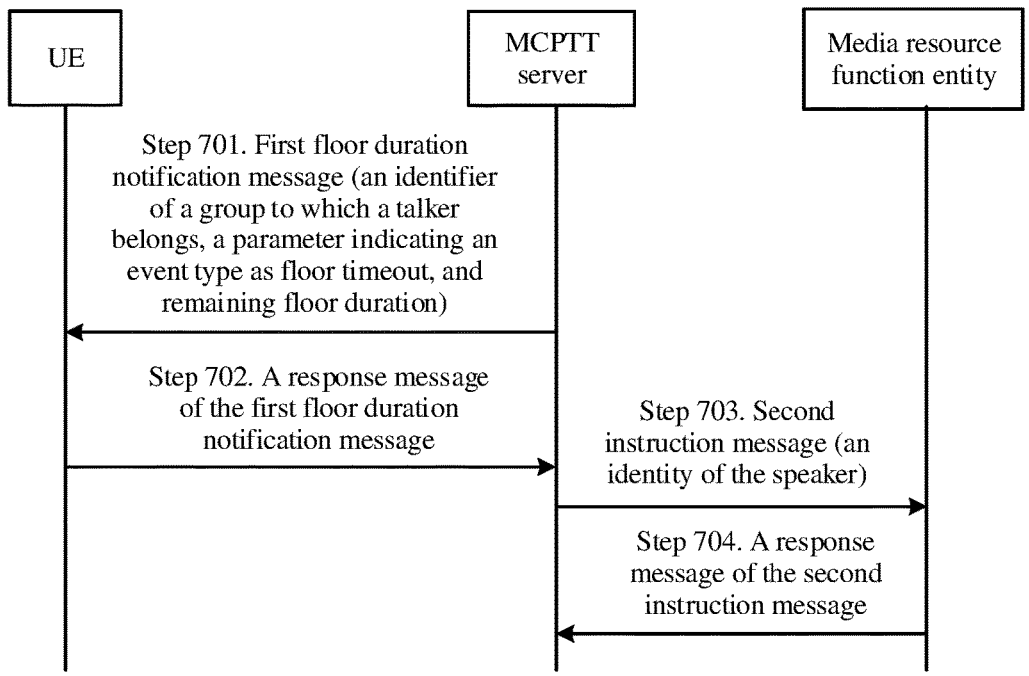
FIG. 7 is flowchart 7 of another floor control method according to an embodiment of the present invention.

Embodiment 7 of the present invention is described in detail in the following by using FIG. 7 as an example. This embodiment of the present invention provides a floor control method, the method is specifically a remaining floor duration notification procedure, and the method includes the following steps.

Step 701: The MCPTT server determines that the talker needs to be notified of remaining floor duration, and generates a first floor duration notification message, where the first floor duration notification message includes an identifier of a group to which the talker belongs, a parameter indicating that an event type is floor timeout, and the remaining floor duration. The MCPTT server sends the first floor duration notification message to the UE.

Optionally, a message type of the first floor duration notification message may be an information INFO message or a notification NOTIFY message in the SIP protocol.

Specifically, the determining, by the MCPTT server, that the talker needs to be notified of remaining floor duration may be:

A timer is configured in the MCPTT server. A timing time of the timer may be a time obtained by subtracting one minute from floor duration of the talker. When the timer expires, the MCPTT server is triggered to generate the first floor duration notification message.

Step 702: The UE receives the first floor duration notification message that is sent by the MCPTT server, and generates a response message of the first floor duration notification message according to the first floor duration notification message. The UE sends the response message of the first floor duration notification message to the MCPTT server.

Optionally, a message type of the response message of the first floor duration notification message may be a 200 message in the SIP protocol.

Step 703: The MCPTT server receives the response message of the first floor duration notification message, and generates a second instruction message according to the response message of the first floor duration notification message, where the second instruction message includes an identity of the talker, and the second instruction message is used by the media resource function entity to instruct the UE to notify the talker of the remaining floor duration. The MCPTT server sends the second instruction message to the media resource function entity.

Optionally, in step 704, the media resource function entity receives the second instruction message, and generates a response message of the second instruction message according to the second instruction message. The media resource function entity sends the response message of the second instruction message to the MCPTT server. The media resource function entity controls a media stream to play an announcement for the talker on the UE, so as to notify the talker of the remaining floor duration. Likewise, referring to the example in step 701, the remaining floor duration may be one minute.

According to the floor control method provided in Embodiment 7 of the present invention, a control plane and a media plane of a PTT service can be separated, and transmission information on a control plane in floor control and a remaining floor duration notification procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension.

Figure 8:
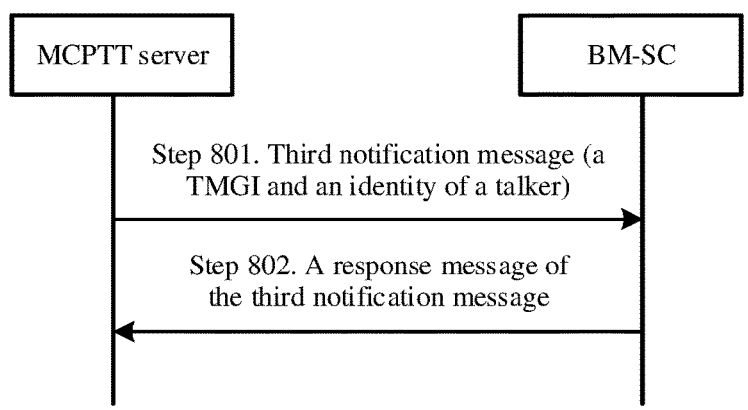
FIG. 8 is flowchart 8 of another floor control method according to an embodiment of the present invention.

Embodiment 8 of the present invention is described in detail in the following by using FIG. 8 as an example. This embodiment of the present invention provides a floor control method, the method is specifically a procedure of notifying, by using a multicast channel, another member in a group to which a talker belongs of floor information of the talker, and the method includes the following steps:

Step 801: An MCPTT server sends a first notification message to a broadcast/multicast service center (BM-SC), where the first notification message includes a temporary mobile group identity (TMGI) and an identity of the talker, and the first notification message is used to instruct the BM-SC to notify, by using a multicast channel, a device used by the another member, except the talker, that is in a multicast area and that is in the group to which the talker belongs of information indicating that a floor of the talker is granted or information indicating that a floor is released.

Step 802: The BM-SC sends a response message of the first notification message to the MCPTT server.

After step 802, the BM-SC notifies, by using the multicast channel, the device used by the another member, except the talker, that is in the multicast area and that is in the group to which the talker belongs of the information indicating that the floor of the talker is granted or the information indicating that the floor is released.

If this embodiment is used for notifying, after a floor release procedure, the device used by the another member, except the talker, that is in the multicast area and that is in the group to which the talker belongs of the information indicating that the floor of the talker is released, the first notification message is used to instruct the BM-SC to notify, by using the multicast channel, the device used by the another member, except the talker, that is in the multicast area and that is in the group to which the talker belongs of the information indicating that the floor of the talker is released. In addition, the identity of the talker is a preset value. Optionally, the preset value may be all zeros or all ones.

Before step 801, this embodiment may further include the following step: The MCPTT server determines that the talker successfully applies for the floor or that the floor is released. Specifically, after the MCPTT server receives a second floor application message, the MCPTT server determines to grant the talker the floor, and the MCPTT server may perform step 801 after determining to grant the talker the floor. Alternatively, after the MCPTT server receives a second floor application message, the MCPTT server determines to deny granting the talker the floor, and the MCPTT server may perform step 801 after determining to deny granting the talker the floor. Step 801 may be performed after or before a response message of a second floor release message is sent to a media resource function entity. The MCPTT server may perform step 801 after receiving a response message that is of a third floor release message and that is sent by the media resource function entity, or may perform step 801 and after generating a third floor release message and before receiving a response message that is of the third floor release message and that is sent by the media resource function entity.

Figure 9:
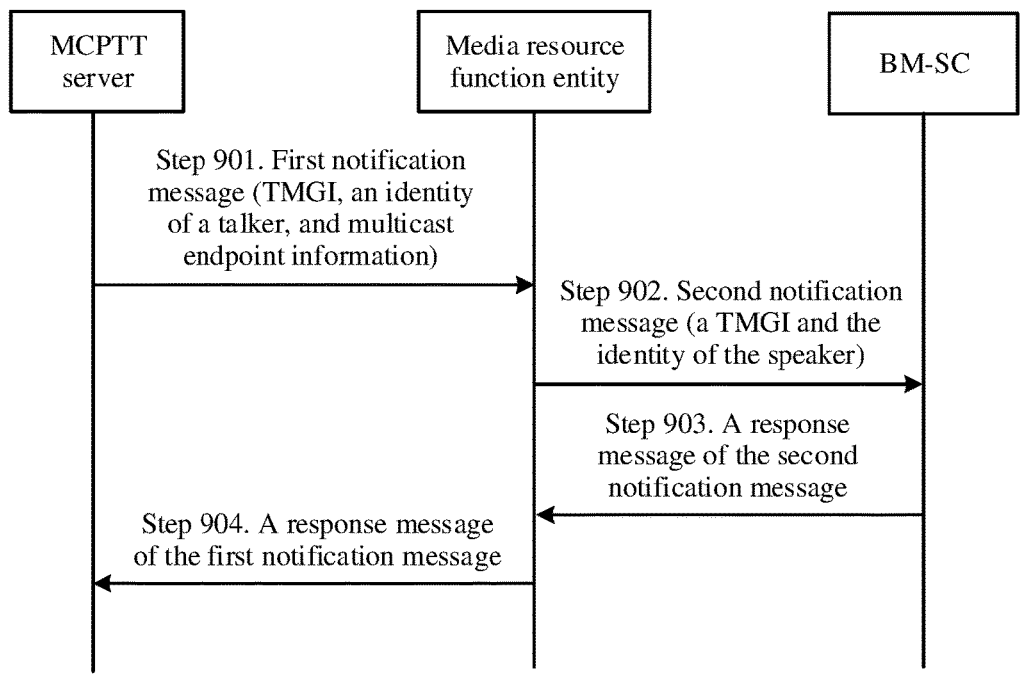
FIG. 9 is flowchart 9 of another floor control method according to an embodiment of the present invention.

Embodiment 9 of the present invention is described in detail in the following by using FIG. 9 as an example. This embodiment of the present invention provides another method for notifying, in a multicast manner, another member in a group to which a talker belongs, and the method includes the following steps:

Step 901: The MCPTT server sends, at a multicast endpoint, a first notification message to a media resource function entity, where the first notification message includes a temporary mobile group identity (TMGI), an identity of the talker, and multicast endpoint information, and the first notification message is used to instruct the media resource function entity to notify, by using a BM-SC and by using a multicast channel, a device used by another member, except the talker, that is in a multicast area and that is in a group to which the talker belongs of information indicating that a floor of the talker is granted or information indicating that a floor is released.

Step 902: After receiving the first notification message, the media resource function entity generates a second notification message according to the first notification message, and sends the second notification message to the BM-SC by using the multicast endpoint, where the second notification message includes the TMGI and the identity of the talker, and the second notification message is used to instruct the BM-SC to notify, by using the multicast channel, the device used by the another member, except the talker, that is in the multicast area and that is in the group to which the talker belongs of the information indicating that the floor of the talker is granted or the information indicating that the floor is released.

Step 903: The BM-SC generates a response message of the second notification message according to the second notification message, and sends the response message of the second notification message to the media resource function entity.

Step 904: The media resource function entity generates a response message of the first notification message according to the response message of the second notification message, and the media resource function entity sends the response message of the first notification message to the MCPTT server.

If this embodiment is used for notifying, after a floor release procedure, the device used by the another member, except the talker, that is in the multicast area and that is in the group to which the talker belongs of the information indicating that a floor of the talker is released, the first notification message is used to instruct the BM-SC to notify, by using the multicast channel, the device used by the another member except the talker, that is in the multicast area and that is in the group to which the talker belongs of the information indicating that the floor of the talker is released. In addition, the identity of the talker is a preset value. Optionally, the preset value may be all zeros or all ones.

Before step 901, this embodiment may further include the following step: The MCPTT server determines that the talker successfully applies for the floor or that the floor is released. Specifically, after the MCPTT server receives a second floor application message, the MCPTT server determines to grant the talker the floor, and the MCPTT server may perform step 901 after determining to grant the talker the floor. Alternatively, after the MCPTT server receives a second floor application message, the MCPTT server determines to deny granting the talker the floor, and the MCPTT server may perform step 901 after determining to deny granting the talker the floor. Step 901 may be performed after or before a response message of a second floor release message is sent to the media resource function entity. The MCPTT server may perform step 901 after receiving a response message that is of a third floor release message and that is sent by the media resource function entity, or may perform step 901 after generating a third floor release message and before receiving a response message that is of the third floor release message and that is sent by the media resource function entity.

Figure 10:
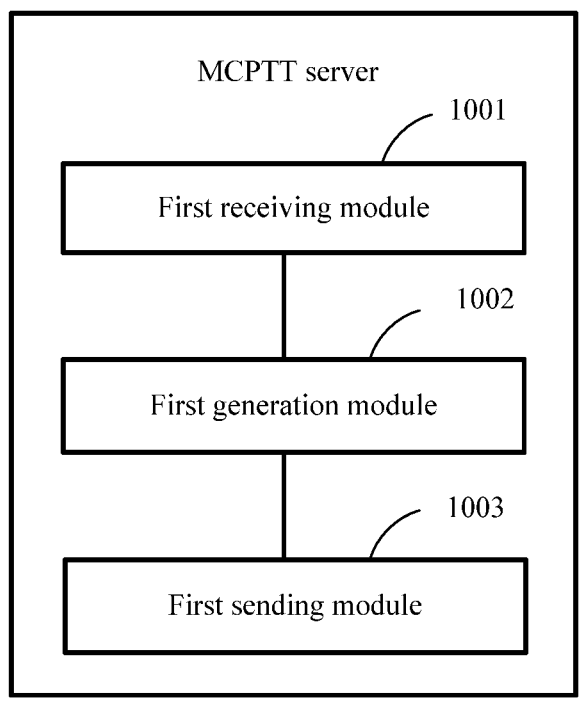
FIG. 10 is a structural diagram of an MCPTT server according to an embodiment of the present invention.

Embodiment 10 of the present invention is described in detail in the following by using FIG. 10 as an example. This embodiment of the present invention provides a floor control apparatus, the apparatus may be an MCPTT server, and the apparatus includes a first receiving module 1001, a first generation module 1002, and a first sending module 1003.

The first receiving module 1001 is configured to receive a first message that is sent by a UE, where the first message includes an identifier of a group to which a talker corresponding to the UE belongs and a parameter indicating that an event type is a floor request. Preferably, a message type of the first message may be an information INFO message or a notification NOTIFY message in the SIP protocol.

The first generation module 1002 is configured to generate a second message according to the floor control policy and the first message, where a message type of the second message may be an information INFO message or a notification NOTIFY message in the SIP protocol, and the second message includes the identifier of the group to which the talker corresponding to the UE belongs and the parameter indicating that an event type is a floor request, and the second message is used to instruct the UE to notify the talker to whom the UE belongs that a floor is granted.

The floor control policy includes at least one of a status of the group to which the talker belongs, a user priority, a user floor control right, or a current floor queue status.

The determining, according to the user priority, to grant the talker a floor may be: determining that a user priority of the talker is higher than that of a current floor holder or meets a floor grant standard, and granting the talker the floor.

The determining, according to the user floor control right, to grant the talker a floor may be: determining that the talker has a user floor right, and granting the talker the floor.

The determining, according to the status of the group to which the talker belongs, to grant the talker a floor may be: checking whether currently there is a user in the group who holds the floor. If currently there is a floor holder, the floor is granted to the talker after it is determined that a user priority of the talker is higher than that of the current floor holder and it is determined that the talker has a user floor right (for example, the talker is not in a blacklist); or if currently there is no floor holder, the floor is granted to the talker after it is determined that the talker has a user floor right (for example, the talker is not in a blacklist).

The determining, according to the current floor queue status, to grant the talker a floor maybe: determining, according to a priority of the talker, that there is no need to perform floor priority queuing, and determining to grant the talker the floor, or determining, according to a priority of the talker, that there is a need to perform floor priority queuing, and determining to grant the talker the floor after queuing up for a period of time.

The first sending module 1003 is configured to send the second message to the UE.

The first receiving module 1001 is further configured to receive a response message that is of the second message and that is sent by the UE.

Optionally, a message type of the response message of the second message may be a 200 message in the SIP protocol.

The first generation module 1002 is further configured to generate a first instruction message according to the response message of the second message, where the first instruction message is used to instruct a media resource function entity to perform uplink voice switching on a media plane.

The first sending module 1003 is further configured to send the first instruction message to the media resource function entity.

This embodiment describes a structure and functions of an MCPTT server applied to a floor application procedure. For details, refer to Embodiment 3.

The MCPTT server may further have the following structure and/or functions.

In an embodiment, the MCPTT server may further be applied to a floor release procedure. Further, refer to Embodiment 5.

The first receiving module is further configured to receive a fourth message that is sent by the UE, where the fourth message includes the identifier of the group to which the talker corresponding to the UE belongs, a parameter indicating that an event type is floor release, and a release cause value.

Optionally, a message type of the fourth message may be an information INFO message or a notification NOTIFY message in the SIP protocol.

The first generation module is further configured to generate a second instruction message according to the fourth message, where the second instruction message is used to instruct the media resource function entity to disconnect from the UE on the media plane.

The first sending module is further configured to send the second instruction message to the media resource function entity.

It should be noted that this embodiment may be combined with the foregoing other embodiments, for example, combined with at least one of the embodiment of floor release, floor duration notification, or notification by using a multicast channel, so as to form a media resource function entity having at least one of a function of floor release, floor duration notification, or notification by using a multicast channel, and a floor application function. Alternatively, this embodiment may be an independent embodiment, that is, a media resource function entity having only a floor release function. When this embodiment is an independent embodiment, description about functions of functional parts should be changed from "further configured to" into "configured to".

In an embodiment, the MCPTT server may further be applied to a floor release procedure. Further, refer to Embodiment 6.

The apparatus further includes a first determining and generation module.

The first determining and generation module is configured to determine that the talker needs to release the floor, and generate a fifth message, where the fifth message includes the identifier of the group to which the talker corresponding to the UE belongs, a parameter indicating that an event type is floor release, and a release cause value. Optionally, a message type of the fifth message may be an information INFO message or a notification NOTIFY message in the SIP protocol.

The first sending module is further configured to send the fifth message to the UE.

The first receiving module is further configured to receive a response message that is of the fifth message and that is sent by the UE.

Optionally, a message type of the response message of the fifth message may be a 200 message in the SIP protocol.

The first generation module is further configured to generate a third instruction message according to the response message of the fifth message, where the third instruction message is used to instruct the media resource function entity to disconnect from the UE on the media plane.

The first sending module is further configured to send the third instruction message to the media resource function entity.

In an embodiment, the MCPTT server may be further configured to notify, by using a multicast channel, another member in the group to which the talker belongs of information indicating that a floor of the talker is granted. Further, refer to Embodiment 8.

The first sending module is further configured to send a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is granted.

It should be noted that this embodiment may be combined with the foregoing other embodiments, for example, combined with the embodiment of floor application, and then optionally combined with the embodiments of floor release and floor duration notification, so as to form a media resource function entity having functions of floor application and notification by using a multicast channel and optionally having functions of floor release and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to".

In an embodiment, the media resource function entity may be further configured to notify, by using a multicast channel, another member in the group to which the talker belongs of information indicating that a floor of the talker is released. Further, refer to Embodiment 9.

The first sending module is further configured to send a first notification message to a BM-SC, where the first notification message includes a TMGI and an identity of the talker, and the first notification message is used to instruct the BM-SC to notify, by using a multicast channel, a device used by another member, except the talker, that is in a multicast area and that is in the group to which the talker belongs of information indicating that a floor of the talker is released.

The identity of the talker is a preset value.

Optionally, the preset value may be all zeros or all ones.

It should be noted that this embodiment may be combined with the foregoing other embodiments, for example, combined with the embodiment of floor release, and then optionally combined with the embodiments of floor application and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to".

In an embodiment, the MCPTT server may further be applied to a floor duration notification procedure. Further, refer to Embodiment 7.

The first determining and generation module is further configured to determine that the talker needs to be notified of remaining floor duration, and generate a first floor duration notification message, where the first floor duration notification message includes the identifier of the group to which the talker belongs, a parameter indicating that an event type is floor timeout, and the remaining floor duration.

Optionally, a message type of the first floor duration notification message may be an information INFO message or a notification NOTIFY message in the SIP protocol.

The first sending module is further configured to send the first floor duration notification message to the UE to the UE.

The first receiving module is further configured to receive a response message that is of the first floor duration notification message and that is sent by the UE.

Optionally, a message type of the response message of the first floor duration notification message may be a 200 message in the SIP protocol.

The first generation module is further configured to generate the second instruction message according to the response message of the first floor duration notification message, where the second instruction message includes the identity of the talker, and the second instruction message is used by the media resource function entity to instruct the UE to notify the talker of the remaining floor duration.

The first sending module is further configured to send the second instruction message to the media resource function entity.

It should be noted that this embodiment may be combined with the foregoing other embodiments, for example, combined with at least one of the embodiment of floor application or floor release, and optionally combined with the embodiment of notification by using a multicast channel, so as to form a media resource function entity having at least one of a function of floor application or floor release, and a function of remaining floor duration notification and optionally having a function of notification by using a multicast channel. Alternatively, this embodiment may be an independent embodiment, that is, form a media resource function entity having only a function of remaining floor duration notification. When this embodiment is an independent embodiment, description about functions of functional parts should be changed from "further configured to" into "configured to."

Figure 11:
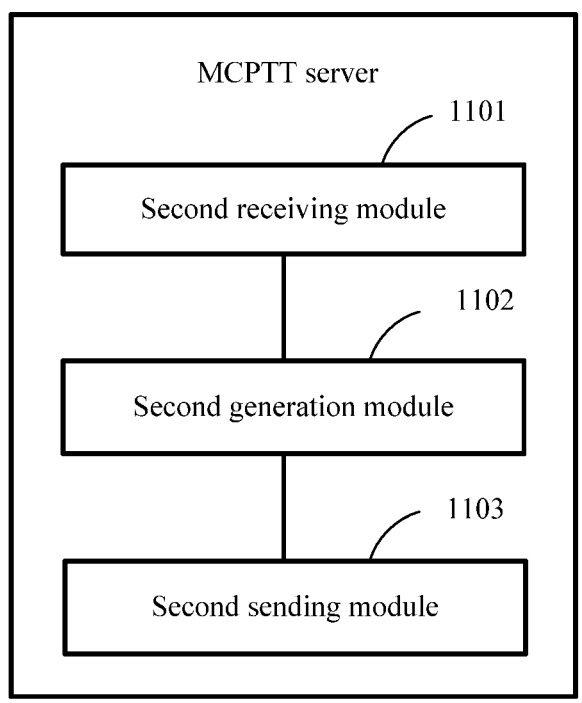
FIG. 11 is a structural diagram of another MCPTT server according to an embodiment of the present invention.

Embodiment 11 of the present invention in detail is described in the following by using FIG. 11 as an example. This embodiment of the present invention provides a floor control apparatus, which is specifically applied to a floor deny procedure. The apparatus may be an MCPTT server. Further, refer to Embodiment 2. The apparatus includes a second receiving module 1101, a second generation module 1102, and a second sending module 1103.

The second receiving module 1101 is configured to receive a first message that is sent by UE, where the first message includes an identifier of a group to which a talker corresponding to the UE belongs and a parameter indicating that an event type is a floor request.

Optionally, a message type of the first message may be an information INFO message or a notification NOTIFY message in the SIP protocol.

The second generation module 1102 is configured to generate a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value.

Optionally, a message type of the third message may be an information INFO message or a notification NOTIFY message in the SIP protocol.

The floor control policy includes at least one of a status of the group to which the talker belongs, a user priority, a user floor control right, or a current floor queue status.

The determining, according to the user priority, to deny granting the talker a floor may be: determining that a user priority of the talker is lower than that of a current floor holder or does not meet a floor grant standard, and denying granting the talker the floor.

The determining, according to the user floor control right, to deny granting the talker a floor may be: determining that the talker does not have a user floor right, and denying granting the talker the floor.

The determining, according to the status of the group to which the talker belongs, to deny granting the talker a floor may be: checking whether currently there is a user in the group who holds the floor. If currently there is a floor holder, granting of the floor to the talker is denied after it is determined that a user priority of the talker is lower than that of the current floor holder or it is determined that the talker does not have a user floor right (for example, the talker is in a blacklist); or if currently there is no floor holder, granting of the floor to the talker is denied after it is determined that the talker does not have a user floor right (for example, the talker is in a blacklist).

The determining, according to the current floor queue status, to deny granting the talker a floor maybe: determining, according to a priority of the talker, that there is a need to perform floor priority queuing, and determining to deny granting the talker the floor.

The second sending module 1103 is configured to send the third message to the UE.

Optionally, a message type of the first message is an information INFO message or a notification NOTIFY message; and/or, a message type of the third message is an information INFO message or a notification NOTIFY message.

Figure 12:
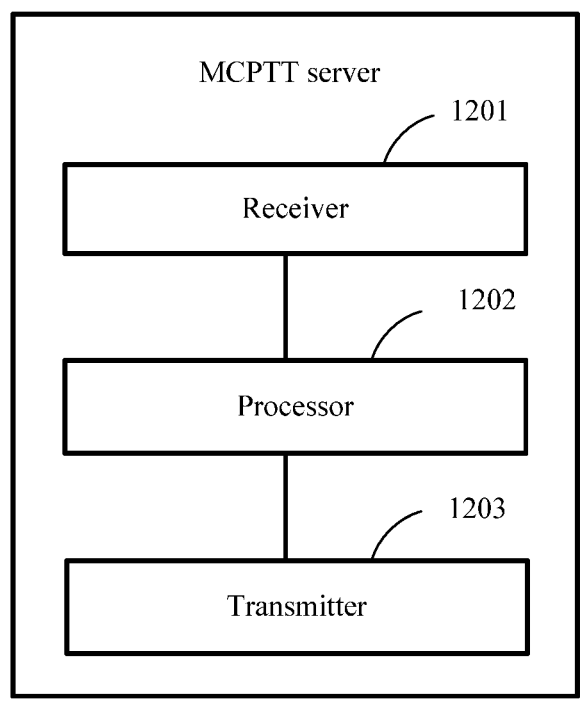
FIG. 12 is a structural diagram of still another MCPTT server according to an embodiment of the present invention.

Embodiment 12 of the present invention is described in detail in the following by using FIG. 12 as an example. This embodiment of the present invention provides a floor control apparatus, which is specifically applied to a floor application procedure. The apparatus may be an MCPTT server. Further, refer to Embodiment 3. The apparatus includes a receiver 1201, a processor 1202, and a transmitter 1203.

The receiver 1201 is configured to receive a first message that is sent by a UE, where the first message includes an identifier of a group to which a talker corresponding to the UE belongs and a parameter indicating that an event type is a floor request.

Optionally, a message type of the first message is an information INFO message or a notification NOTIFY message in the SIP protocol.

The processor 1202 is configured to generate a second message according to the floor control policy and the first message, where the second message includes the identifier of the group to which the talker corresponding to the UE belongs and the parameter indicating that an event type is a floor request, and the second message is used to instruct the UE to notify the talker to whom the UE belongs that a floor is granted.

Optionally, a message type of the second message may be an information INFO message or a notification NOTIFY message in the SIP protocol.

The floor control policy includes at least one of a status of the group to which the talker belongs, a user priority, user floor control right, or a current floor queue status.

The determining, according to the user priority, to grant the talker a floor may be: determining that a user priority of the talker is higher than that of a current floor holder or meets a floor grant standard, and granting the talker the floor.

The determining, according to the user floor control right, to grant the talker a floor may be: determining that the talker has a user floor right, and granting the talker the floor.

The determining, according to the status of the group to which the talker belongs, to grant the talker a floor may be: checking whether currently there is a user in the group who holds the floor. If currently there is a floor holder, the floor is granted to the talker after it is determined that a user priority of the talker is higher than that of the current floor holder, and it is determined that the talker has a user floor right (for example, the talker is not in a blacklist); or if currently there is no floor holder, the floor is granted to the talker after it is determined that the talker has a user floor right (for example, the talker is not in a blacklist).

The determining, according to the current floor queue status, to grant the talker a floor maybe: determining, according to a priority of the talker, that there is no need to perform floor priority queuing, and determining to grant the talker the floor, or determining, according to a priority of the talker, that there is a need to perform floor priority queuing, and determining to grant the talker the floor after queuing up for a period of time.

The transmitter 1203 is configured to send the second message to the UE.

The receiver 1201 is further configured to receive a response message that is of the second message and that is sent by the UE.

Optionally, a message type of the response message of the second message may be a 200 message in the Session Initiation Protocol (SIP).

The processor 1202 is further configured to generate a first instruction message according to the response message of the second message, where the first instruction message is used to instruct a media resource function entity to perform uplink voice switching on a media plane.

The transceiver 1203 is further configured to send the first instruction message to the media resource function entity.

Figure 13:
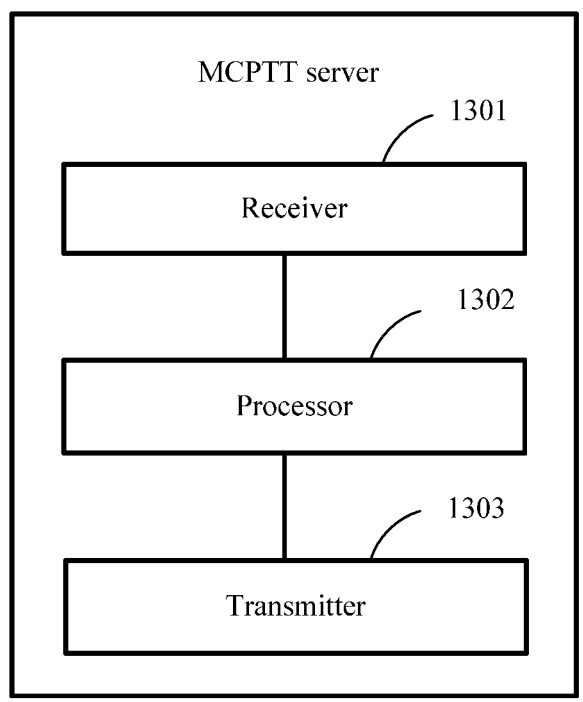
FIG. 13 is a structural diagram of yet another MCPTT server according to an embodiment of the present invention.

Embodiment 13 of the present invention is described in detail in the following by using FIG. 13 as an example. This embodiment of the present invention provides a floor control apparatus, which is specifically applied to a floor deny procedure. The apparatus may be an MCPTT server. Further, refer to Embodiment 2. The apparatus includes a receiver 1301, a processor 1302, and a transmitter 1303.

The receiver 1301 is configured to receive a first message that is sent by a UE, where the first message includes an identifier of a group to which a talker corresponding to the UE belongs and a parameter indicating that an event type is a floor request.

Optionally, a message type of the first message is an information INFO message or a notification NOTIFY message in the SIP protocol.

The processor 1302 is configured to generate a third message according to the floor control policy and the first message, where the third message is used to indicate that a floor application of the UE fails, and the third message includes the identifier of the group to which the talker corresponding to the UE belongs, a parameter indicating that an event type is floor deny, and a deny cause value.

Optionally, a message type of the third message may be an information INFO message or a notification NOTIFY message in the SIP protocol.

The floor control policy includes at least one of a status of the group to which the talker belongs, a user priority, a user floor control right, or a current floor queue status.

The determining, according to the user priority, to deny granting the talker a floor may be: determining that a user priority of the talker is lower than that of a current floor holder or does not meet a floor grant standard, and denying granting the talker the floor.

The determining, according to the user floor control right, to deny granting the talker a floor may be: determining that the talker does not have a user floor right, and denying granting the talker the floor.

The determining, according to the status of the group to which the talker belongs, to deny granting the talker a floor may be: checking whether currently there is a user in the group who holds the floor. If currently there is a floor holder, granting of the floor to the talker is denied after it is determined that a user priority of the talker is lower than that of the current floor holder, or it is determined that the talker does not have a user floor right (for example, the talker is in a blacklist); or if currently there is no floor holder, granting of the floor to the talker is denied after it is determined that the talker does not have a user floor right (for example, the talker is in a blacklist).

The determining, according to the current floor queue status, to deny granting the talker a floor maybe: determining, according to a priority of the talker, that there is a need to perform floor priority queuing, and determining to deny granting the talker the floor.

The transmitter 1303 is configured to send the third message to the UE.

For other features of the apparatus, refer to related description in the foregoing method embodiments.

A person skilled in the art may understand that division of the modules in the apparatuses in the embodiments of the present invention is function division, and an actual specific structure may be obtained by dividing or combining the foregoing function modules.

The term "receive" in the foregoing embodiments of the present invention may be understood as actively obtaining information from another unit or receiving information that is sent by another unit.

The sequence numbers of the foregoing embodiments of the present invention are merely for illustrative purposes, and are not intended to indicate priorities of the embodiments.

The technical solutions disclosed in the claims also fall within the protection scope of the embodiments of the present invention.

A person skilled in the art may understand that all or a part of processing in the methods of the foregoing embodiments may be implemented by instructing related hardware by a program, where the program may be stored in a computer readable storage medium. When the program runs, the steps of the method embodiments are performed. The foregoing storage medium includes: any medium that can store program code, such as a ROM, a RAM, a magnetic disk, or an optical disc. The foregoing related hardware may be various types of processors, such as a Central Processing Unit (CPU).

The foregoing descriptions are merely specific implementation manners of the present embodiments, but are not intended to limit the protection scope of the present embodiments. Any variation or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A floor control method comprising:
receiving, by a server over Long Term Evolution network, a first message sent by user equipment (UE), wherein the first message comprises a parameter indicating that an event type is a floor request;
generating, by the server, a second message according to a floor control policy and the first message, wherein the second message comprises a parameter indicating that an event type is floor granted;
sending, by the server, the second message to the UE, wherein the second message is used to instruct the UE to notify a user of the UE that a floor is granted;
receiving, by the server, a response message responsive to the second message sent by the UE;
generating, by the server, a first instruction message according to the response message, wherein the first instruction message is used to instruct a media distributor to perform uplink voice switching on a media plane; and
sending, by the server, the first instruction message to the media distributor.

2. The method according to claim 1, further comprising receiving, by the server, a fourth message sent by the UE, wherein the fourth message comprises a parameter indicating that an event type is a floor release.

3. The method according to claim 1, further comprising:
determining, by the server, that the user needs to release the floor;
generating, by the server, a fifth message, wherein the fifth message comprises a parameter indicating that an event type is floor release;
sending, by the server, the fifth message to the UE; and
receiving, by the server, a response message sent by the user in response to the fifth message.

4. A floor control apparatus comprising:
a receiver configured to receive a first message sent by user equipment (UE), wherein the first message comprises a parameter indicating that an event type is a floor request;
a processor configured to generate a second message according to a floor control policy and the first message, wherein the second message comprises the parameter indicating that the event type is a floor granted; and
a sender configured to send the second message to the UE, wherein the second message is used to instruct the UE to notify a user to of the UE that a floor is granted,
wherein the receiver is further configured to receive a response message responsive to the second message sent by the UE,
wherein the processor is further configured to generate a first instruction message according to the response message, the first instruction message being used to instruct a media distributor to perform uplink voice switching on a media plane, and
wherein the sender is further configured to send the first instruction message to the media distributor.

5. The apparatus according to claim 4, wherein the receiver is further configured to receive a fourth message sent by the UE, and wherein the fourth message comprises a parameter indicating that an event type is a floor release.

6. The apparatus according to claim 4, wherein the processor is configured to:
determine that the user needs to release the floor; and
generate a fifth message, wherein the fifth message comprises a parameter indicating that an event type is a floor release,
wherein the sender is further configured to send the fifth message to the UE, and
wherein the receiver is further configured to receive a response message sent by the UE in response to the fifth message.

7. A non-transitory computer-readable storage medium comprising instructions which, when executed by a computer in a server over Long Term Evolution network, cause the computer to:
receive a first message sent by user equipment (UE), wherein the first message comprises a parameter indicating that an event type is a floor request;
generate a second message according to a floor control policy and the first message, wherein the second message comprises the parameter indicating that the event type is floor granted; and
send the second message to the UE, wherein the second message is used to instruct the UE to notify a user of the UE that a floor is granted;
receive a response message responsive to the second message sent by the UE;
generate a first instruction message according to the response message, wherein the first instruction message is used to instruct a media distributor to perform uplink voice switching on a media plane; and
send the first instruction message to the media distributor.

8. The non-transitory computer-readable storage medium according to claim 7, further comprising instructions to receive a fourth message sent by the UE, wherein the fourth message comprises a parameter indicating that an event type is floor release.

9. The non-transitory computer-readable storage medium according to claim 7, further comprising instructions to:
determine that the user needs to release the floor;
generate a fifth message, wherein the fifth message comprises a parameter indicating that an event type is a floor release;
send the fifth message to the UE; and
receive a response message sent by the user in response to the fifth message.

* * * * *